D. W. FLYNN.
SMOKING PIPE.
APPLICATION FILED FEB. 15, 1911.
1,009,495.
Patented Nov. 21, 1911.
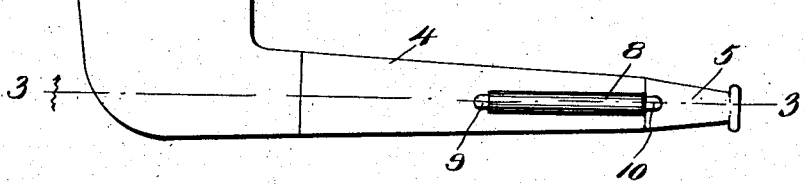
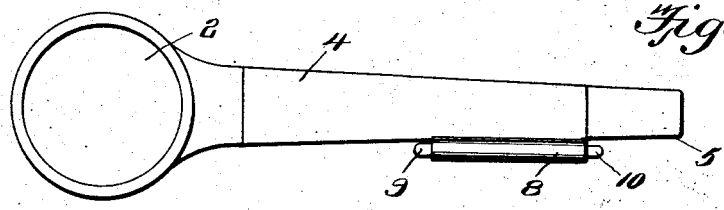
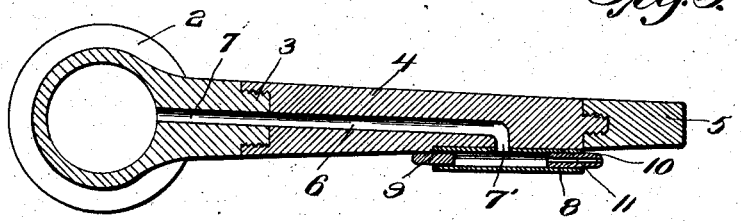
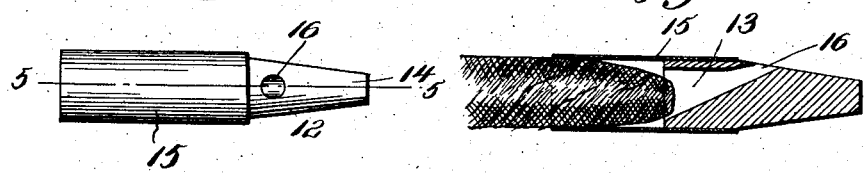
Witnesses
W. S. McDowell
Inventor
David W. Flynn
By Victor J. Evans
Attorney

UNITED STATES PATENT OFFICE.

DAVID W. FLYNN, OF MAUCKPORT, INDIANA.

SMOKING-PIPE.

1,009,495.  Specification of Letters Patent.  Patented Nov. 21, 1911.

Application filed February 15, 1911. Serial No. 608,670.

*To all whom it may concern:*

Be it known that I, DAVID W. FLYNN, a citizen of the United States, residing at Mauckport, in the county of Harrison and State of Indiana, have invented new and useful Improvements in Smoking-Pipes, of which the following is a specification.

The invention relates to smoking pipes, and more particularly to the class of stem attachments for smoking pipes.

The primary object of the invention is the provision of a pipe in which the stem thereof is constructed with a trap for receiving saliva and nicotin that may be present within the bore of the stem, so that the same will not flow into the mouth of the user of the pipe during the smoking thereof.

Another object of the invention is the provision of a pipe in which the stem thereof at the trap formed therein is provided with a removable plug which permits access to be had to the trap, whereby the same may be cleaned for sanitary purposes.

A further object of the invention is the provision of a pipe in which the stem thereof is formed with a trap for collecting and accumulating saliva and nicotin during the smoking of the pipe, the said trap being provided with an absorbent mouth piece or tip which is adapted to collect saliva or nicotin and prevent the same from entering the mouth of the user of the pipe, the tip being readily removable for the cleaning thereof, or the placing of a new one in its stead, and also the trap is accessible whereby the same may be cleaned in a ready and convenient manner.

A still further object of the invention is the provision of a pipe in which the stem thereof will be freed of nicotin or saliva, thus assuring a pleasant and sweet taste to the smoker during the use of the pipe.

A still further object of the invention is the provision of a pipe which is simple in construction, thoroughly reliable and efficient in operation, and inexpensive in manufacture.

With these and other objects in view, the invention consists of the construction, combination and arrangement of parts, as will be hereinafter more fully described, illustrated in the accompanying drawings, and pointed out in the claim hereunto appended.

In the drawings: Figure 1 is a side elevation of a pipe constructed in accordance with the invention. Fig. 2 is a top plan view thereof. Fig. 3 is a sectional view on the line 3—3 of Fig. 1. Fig. 4 is a side elevation of a cigar holder constructed in accordance with the invention. Fig. 5 is a sectional view on the line 5—5 of Fig. 4.

Similar reference characters indicate corresponding parts throughout the several views of the drawings.

Referring to the drawings by numerals, the pipe comprises a bowl 2 which may be constructed from any suitable material and of any desirable shape, provided with a nipple extension 3, to which is detachably connected a stem 4, the free end of which is formed with a mouth piece 5, and this stem contains a diagonally disposed bore 6, the same being in registration with and continued at its upper end by means of a passage 7 opening into the bowl 2 of the pipe. The outer end of the bore 6 terminates from the mouth piece 5 into a lateral branch bore 7' opening through one side of the stem into a trap, as will be hereinafter more fully described. This trap comprises a cylindrical or tubiform body or shell 8, the latter being secured or formed integral with the stem 4 at one side thereof, the body 8 being open at opposite ends, and is designed to form a trap for receiving saliva or nicotin flowing thereinto from the bowl 2 through the smoke passage or bore in the stem 4.

Removably fitted in the outer end of the body 8 is a closure plug 9 which may be readily detached for enabling the trap to be cleaned for sanitary purposes. At the opposite inner end of the body 8 and fitted therein is a removable absorbent tip 10 having a central bore 11, through which smoke is admitted to the mouth of the user of the pipe, when the mouth piece 5 is inserted in the mouth of the smoker. It will be noted that the tip 10 during the smoking of the pipe, will absorb any saliva or nicotin flowing in the direction of the mouth of the smoker, so that such saliva or nicotin will not enter the mouth of the user during the smoking of the pipe.

In Figs. 4 and 5, there is shown a cigar holder, comprising a mouth piece 12 formed from absorbent material, preferably corn pith molded or otherwise shaped, as desired. One end of the mouth piece 12 is provided with an inwardly tapered socket 13 receiving one end of a cigar when inserted therein. This mouth piece 12, at its opposite end, is formed with a mouth engaging tip 14, to be inserted in the mouth of the smoker of the cigar. Surrounding the socketed end of the mouth piece 12 is a paper carton or ferrule 15, which has its free end extended beyond the mouth piece to any desirable distance, the carton or ferrule being secured to the mouth piece in any suitable manner. The inner end of the socket 13 is laterally directed and opens, as at 16, through one side of the mouth piece, so that when smoking the cigar, the smoke thereof will not burn or cause a biting sensation upon the tongue of the smoker and will enter the mouth of the user at one side of the mouth piece in contradistinction to entering the mouth centrally through the mouth engaging tip 14, as is customary in cigar holders ordinarily used.

It will be apparent that as the main feature of the invention is the side draft in the pipe, it will be observed that the pipe can be constructed in different forms according to the fancy of the manufacturer, without departing from the spirit of the invention. For instance, the ordinary pipe in use may be constructed with a smoke channel opening in the side of the stem, thus preventing saliva from entering the stem when held in the mouth of the user.

What is claimed is:

A smoking pipe comprising a bowl, a stem connected with the bowl and having a passage therein communicating with the bowl and opening through one side of said stem, a trap arranged at one side of the stem and communicating with the passage, a perforated absorbent tip mounted in one end of the trap, and means closing the opposite end of the trap.

In testimony whereof I affix my signature in presence of two witnesses.

DAVID W. FLYNN.

Witnesses:
 ALFRED MATHYS,
 GROVER BODENSTADT.

---

Copies of this patent may be obtained for five cents each, by addressing the "Commissioner of Patents, Washington, D. C."